Dec. 28, 1948.                H. M. DODGE                 2,457,647
             METHOD OF MAKING RUBBER ARTICULATED JOINTS
                      Original Filed Aug. 3, 1942

INVENTOR
Howard M. Dodge
BY
ATTORNEYS

Patented Dec. 28, 1948

2,457,647

UNITED STATES PATENT OFFICE 2,457,647

METHOD OF MAKING RUBBER ARTICULATED JOINTS

Howard M. Dodge, Wabash, Ind., assignor to The General Tire & Rubber Company, Akron, Ohio, a corporation of Ohio Original application August 3, 1942, Serial No. 453,355. Divided and this application March 3, 1945, Serial No. 580,878

1 Claim. (Cl. 29—148.2)

This application is a division of application Serial No. 453,355, filed August 3, 1942, now Patent No. 2,379,508, and the invention relates to torsional joints and to a method of making the same. It particularly relates to a method of assembling a rubber sleeve between two annularly spaced telescoping metal members in the form of sleeves in such a manner that the rubber is held between the metal members in a condition of substantial tension throughout the mass thereof.

It has heretofore been proposed to effect connection between two metallic sleeves by slipping a section of heavy walled rubber tubing along a tapered space into the space between inner and outer sleeve members to compress and elongate the rubber into frictional engagement with each of the sleeve members. In assembling rubber members in this manner where surface movement is had between the rubber and the sleeve members, it is almost essential that a lubricant such as soap be applied to the sliding surface. It has also been found that due to the sliding action of the assembly, strain applied to various parts of the rubber is not at all uniform and that some joints prepared by sliding assembly fail prematurely.

It is an object of the present invention to provide a rubber articulated joint between two annularly spaced telescoping metal members in which the rubber or rubberlike material is under relatively uniform compressive stress throughout.

It is another object of the present invention to provide rubber articulated joints between telescoping metallic sleeves in which the entire mass of rubber is under relatively uniform tension due to compression between said sleeves, and in which the side edges of the compressed rubber occupy substantially the position with respect to the mass thereof as they occupied in the undeformed rubber.

It is still another object of the present invention to provide a method of making stable rubber articulated joints between telescoping metallic members wherein slipping movements between the surface of the metal members and the surface of the rubber member are substantially eliminated during assembly.

It is another object of the present invention to provide a method of assembling rubber articulated torsional joints between telescoping cylindrical metal sleeves wherein the rubber is incorporated between said sleeves without appreciable sliding movement and without the necessity of utilizing a lubricant.

It is a still further object of the present invention to provide a method of assembling rubber flexible bearing blocks suitable for use as fixed supports or as joints between relatively movable members having telescoping metallic members joined by rubberlike material under high compression, wherein the rubberlike material is incorporated between the concentric metallic members with substantial elimination of sliding movement between the surface of the rubber material and the metallic members.

Other objects will be apparent from the following description of the invention as illustrated by the drawing in which.

Figure 1:
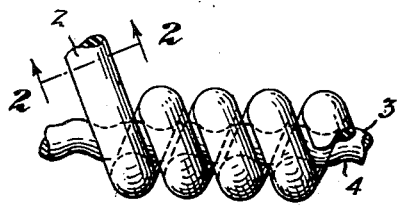
Figure 1 is an elevational view of a mandrel having rubber of cylindrical section wound spirally thereon for curing in open steam, so that rubber rings having a substantially round section may be readily and economically prepared.

In accordance with the present invention, an annular deformable elastic member usually of rubber or vulcanized rubberlike material and of substantially round section, preferably having a volume so that the rubber is in just sufficient amount to substantially fill the annular space between the inner and outer members of the joint, is rolled in an inside-out movement by relative longitudinal or telescopic movement of the inner and outer joint members into the desired position. The annular deformable elastic member is rolled through a tapered path of gradually decreasing diameter and the inner joint member, which is usually a sleeve, is provided with a removable tapered tip or leader member of the desired length to cause the elastic material or rubber member to make one or more complete revolutions so that in its final position the side edges of the elastic material, compressed between the joint members, occupy their molded positions with respect to the main mass of rubbery material, so that they are less subject to oxidation. Thus the same portion of the rubber forms the side edges of the deformed material and the undeformed material.

Referring to the drawing, in which like parts are designated by the same numerals of reference throughout the several views, and more particularly to Figs. 1 through 5, an annular elastic member 1 may be prepared by continuously extruding a strip 2 of rubberlike material and winding it upon a suitable mandrel 3, which has a spiral groove 4 with a rounded surface, curing the wound strip in a suitable medium, such as in a steam chamber (not shown), separating each turn of cured rubber from the other, and adhering two ends of the separate turns together to form a generally toroidal annulus. Separation of the turns is preferably accomplished by applying a cut through each turn longitudinally of the axis of the mandrel.

Figure 2:
Fig. 2 is a sectional view on the line 2—2 of Fig. 1 showing the preferred shape of an extruded strip of rubber for winding around the mandrel to produce a substantially round section when wound thereon.

The strip 2 is preferably extruded in an egg-shaped or slightly elongated section as illustrated in Fig. 2, so that when the strip is bent and applied to the mandrel it will have a round cross section.

The annular elastic member 1 is preferably of generally toroidal shape with a round or substantially round half cross section. If desired, the member 1 may be molded in toroidal form in a suitable mold, such for example as illustrated in Fig. 3.

Figure 3:
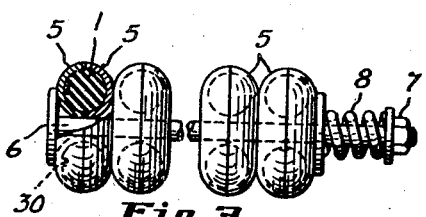
Fig. 3 is an elevational view of a modified form of apparatus which may be used in obtaining the deformable rings preferably used in the practice of the present invention.
Figure 4:
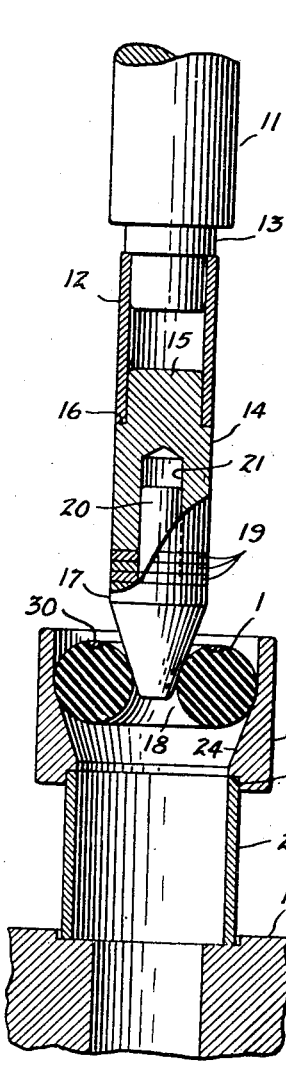
Fig. 4 is an elevational view, partly in section, of a portion of apparatus used in assembling the joints of the present invention, showing the inner and outer sleeves and the annular elastic ring in position for the first step of the assembling process.

The molding apparatus of Fig. 3 comprises a plurality of mold members 5, each having an annular groove of a diameter corresponding to the mean diameter of the elastic members 1. The mold members 5 may be assembled on a bolt 6 to form a toroidal cavity by the coaction of the grooves in each pair of mold members 5. Suitable rubber material is placed in the groove of the mold members and pressure applied by tightening of a nut 7 against a spring 8. The mold apparatus is immersed in a heating medium to cure the rubber therein and produce the annular elastic members 1 in toroidal shape.

In the preparation of joints embodying the present invention, use is preferably made of a suitable press having a platen 10 and a plunger 11 optionally movable toward and away from each other and capable of exerting substantial pressure on elements inserted between the platen 10 and plunger 11. The inner member of the joint may be a cylindrical sleeve 12 and may be carried on the outer tip 13 of the plunger 11. A leader member 14 is preferably applied to the leading end of the sleeve 12. The leader member 14 may have a tail portion 15 adapted to fit within the sleeve 12 so that the shoulder 16 bears against the leading end of the sleeve 12. The leading end of the leader member 14 is provided with a tapered tip 17 to facilitate entry of the leader member into the opening 18 of the annular elastic member 1. The tip 17 of the leader may have a fastening portion 20 which is frictionally held within a bore 21 in the leading end of the cylindrical body of the leader member 14. Means such as spacing washers 19 are preferably provided for adjusting the effective length of the cylindrical body of the leader member 14 so that the annular elastic member 1 will be positioned as desired between the inner sleeve 12 and the outer sleeve 22 when the members 12 and 22 are telescoped in position concentric with each other, as hereinafter described.

The upper or forward end of the shell or outer sleeve 22 carries a removable mounting member 23 having a tapered inner opening 24. The lower portion of the mounting member is bored to receive one end portion of the outer rigid element or sleeve 22. A shoulder 25 of the mounting member 23 is adapted to bear upon the upper end of the shell or outer sleeve 22. The lower inner diameter of the opening 24 adjacent the shoulder 25 is smaller than the diameter of the opening at the upper edge of the member 23 and preferably is substantially equal to the inner diameter of the member 22. The length of the tapered portion of the member 23 may be so chosen that the annular member 1 will be rotated in the desired position within the member 22 without appreciable surface sliding.

Figure 5:
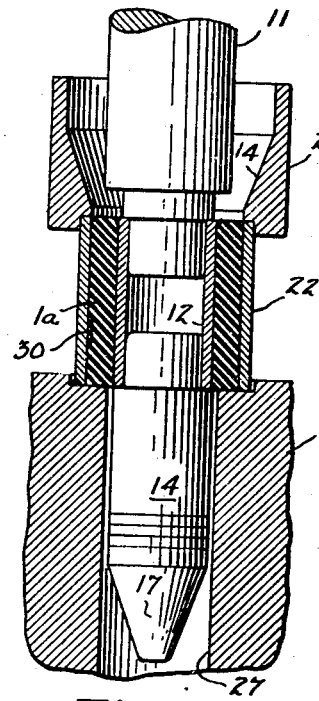
Fig. 5 is a similar view showing the position of apparatus and the members of the joint at the end of the assembling operation.
Figure 6:
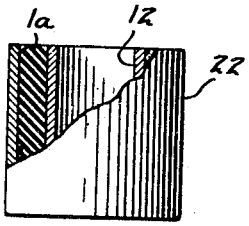
Fig. 6 is an elevational view, with parts broken away, of a joint member embodying the present invention.

In the assembly of the joint or bushing, the annular elastic member 1, which is composed of vulcanized rubber or vulcanized rubberlike material such as synthetic rubber, is disposed within the mounting member 23 with its outer surface portion bearing against the conical or tapered surface of the inner opening 24. The tip 17 of the leader member 14 and the inner member of the sleeve 12 are then successively pressed into the central opening of the generally toroidal elastic member 1, which is of substantially round cross section without sharp corners, causing the rubber of the member 1 to move in a rotatable manner through a tapered path of gradually decreasing cross-sectional area until the desired portion of the sleeve 12 is telescoped into the outer cylindrical sleeve 22. The leader member 14 and the tip 17 extend into an opening 27 of the plate 10, as shown in Fig. 5. Since the members 12 and 22 are assembled with inside-out rotation of the elastic member 1, it is seen that sliding between surface portions of the rubberlike material is substantially eliminated. While the annular elastic member 1a in the joint is under high radial compression, substantially all parts thereof are under identical stress and there is no appreciable stretching of one part with respect to another.

Figure 7:
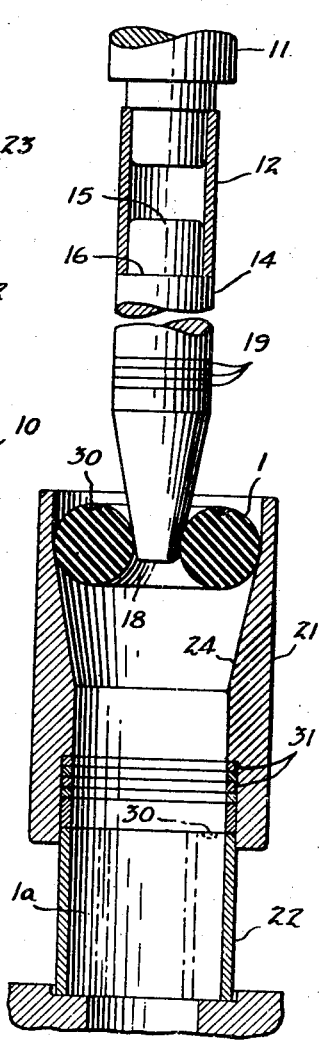
Fig. 7 is an elevational view, partly in section, of a portion of a modified form of apparatus, showing in solid lines joint members in position for assembling and in broken lines the joint in assembled position.

In the modification shown in Fig. 7, the strip 2 of rubberlike material is extruded or molded with a groove or marking 30 of different color than that of the remainder of the material 2. Use may be made of the marking 30 to adjust the length of the leader member 14 by adding or subtracting spacing washers 19 and to also adjust length of the path along the mounting member 23 by the number of washers 31, so that the rubberlike material makes one or more complete rotations in the assembly of the joint and the exposed edges are under no strain other than that produced by compression of the rubber between the untapered inner and outer sleeve members.

When the joint is assembled as shown in Fig. 7, it is seen that the edge portion bears the same relation to the mass of deformable material as it did when vulcanized. The rubberlike material is under stress identical with that obtained by expanding or deforming the diameter of the inner opening 18 of the annular elastic member to correspond with the outer diameter of the tube 12, simultaneously contracting the outer diameter of the annual elastic member to correspond with the inner diameter of the outer sleeve or shell 22 without rotating or sliding movement of the member 1.

Joints produced in accordance with the present invention have high fatigue resistance. Although the rubberlike material is under high stress, the joints are stable and the inner and outer sleeves do not tend to move longitudinally relative to each other when the assembling pressure is removed. Since lubricant is not necessary between the rubber or the rubberlike material and the inner and outer elements, slippage of the inner member with respect to the outer member is had, if had at all, only under exceedingly high deformations, and the entire relative movement between the rigid elements is taken up by strain in the rubberlike material. Rubberlike material $la$ preferably does not extend substantially beyond one of the inner or outer sleeves, whichever is shorter.

The joint members of the present invention may be used as bearing blocks, in spring shackles, in tank treads, or in any other application where joints of similar nature are usable. In the operation of the joints, relative torsional movement between the inner and outer sleeves is taken up by shear in the rubber rather than by surface movement in the interfaces of the metal and elastic members.

Although several embodiments of the invention have been herein shown and described, it will be understood that other modifications of the construction shown may be resorted to without departing from the spirit of this invention as defined in the appended claim.

What I claim is:

In a method for effecting connection between an inner cylindrical element and a concentric outer cylindrical element of a torsional joint, wherein an annular, deformable, elastic, generally toroidal member of rubberlike material having a substantially round cross section and having a thickness greater than the distance between said inner and outer concentric elements is disposed into a mounting member having an internal bore with a tapered surface ad with is disposed at one end of said outer element, and a leader member having a leading end of smaller diameter than the diameter of the inner element is disposed at the leading end of sai dinner element, and said generally toroidal member is caused to rotate in an inside out manner by relative movement of the leader and inner members with respect to the outer member through a path of decreasing cross sectional area into a cylindrical space between said inner and said outer elements, the steps which comprise regulating the effective length of the leader member and the mounting member so that the deformable member is rotated only so that one side edge of the annular undeformed deformable member is also positioned at the side edge of the deformable member in the deformed state, whereby the side edge is in the unstressed condition of greatest resistance to surface deterioration when exposed to air.

HOWARD M. DODGE.

REFERENCES CITED

The following references are of record in the file of this patent:

UNITED STATES PATENTS

| Number | Name | Date |
|---|---|---|
| 1,739,270 | Thiry | Dec. 10, 1929 |
| 2,008,772 | Robertson | July 23, 1935 |
| 2,329,000 | Rembert | Sept. 7, 1943 |
| 2,379,508 | Dodge | July 3, 1945 |